Jan. 4, 1949.                C. D. MORIARTY                2,458,288
                        PIEZOELECTRIC CRYSTAL HOLDER
                           Filed Dec. 24, 1946
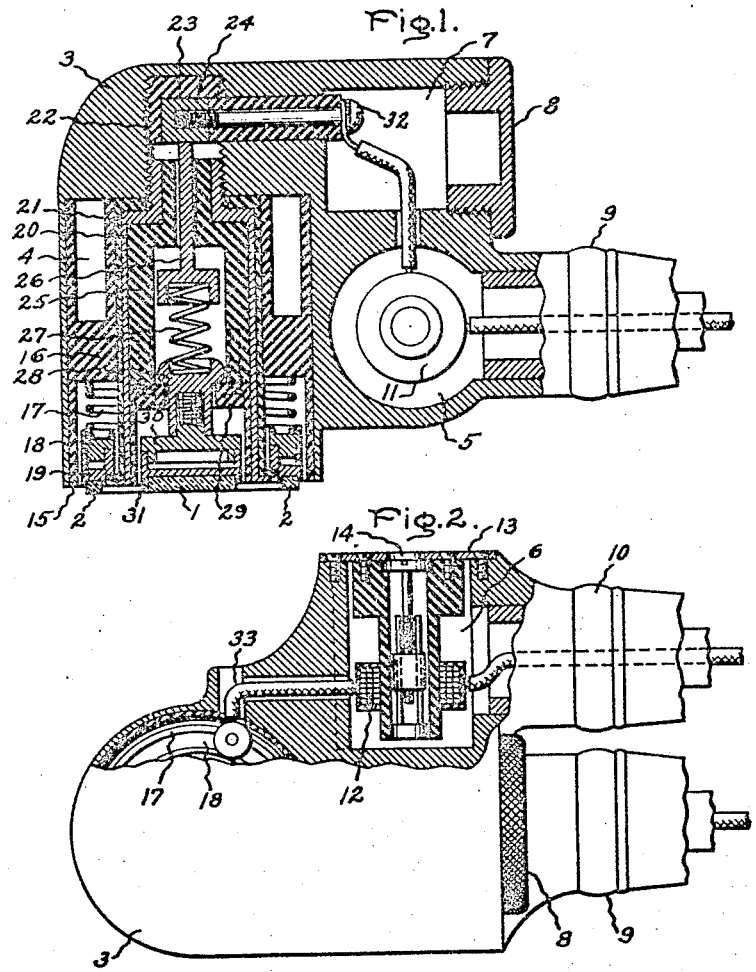
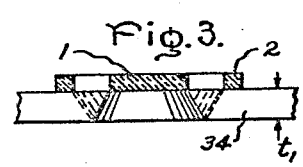
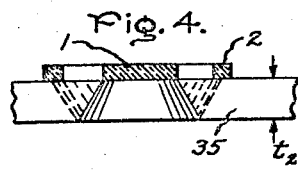
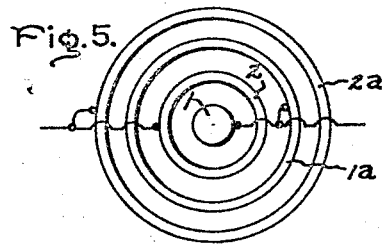
Inventor:
Charles D. Moriarty,
by Crowell P. Mack
His Attorney.

Patented Jan. 4, 1949

2,458,288

UNITED STATES PATENT OFFICE 2,458,288

PIEZOELECTRIC CRYSTAL HOLDER

Charles D. Moriarty, Schenectady, N. Y., assignor to General Electric Company, a corporation of New York Application December 24, 1946, Serial No. 718,188

7 Claims. (Cl. 171—327)

My invention relates to piezoelectric crystal holders and more particularly to a holder for a plurality of piezoelectric crystals used in ultrasonic inspection apparatus whereby transmitter and receiver crystals and their associated circuits are contained in a single assembly.

Non-destructive methods of inspecting materials, such as iron or other metals, by transmitting mechanical vibrations of ultrasonic frequency into the material have been developed and are known in the art. These methods may utilize continuously produced mechanical vibrations or a series of short-duration mechanical vibration wave trains or pulses. Constant or variable frequencies have been employed.

When employing mechanical vibration wave trains, a single piezoelectric crystal may function as a receiver as well as a transmitter. When operating as a transmitter, a mechanical vibration wave train travels into the material to be analyzed and is reflected back toward its origin by any discontinuity such as a flaw or the opposite surface of the material under test. To allow the single crystal to operate as a receiver as well, it is necessary that the reflected wave train does not reach it before it ceases to act as a transmitter. Thus, dependent upon the time duration of the transmitted wave train and its velocity propagation through the material under test, there is a minimum thickness of material below which the crystal cannot operate properly. Experience has shown that a minimum thickness of one-half inch to one inch is necessary for proper operation when mechanical vibration wave trains of the usual type are employed.

Continuously produced mechanical vibrations are likewise propagated and reflected in a material into which they are transmitted. It has been found that they proceed from the crystal through the material over an area which increases with the distance from the crystal; thus their zone of influence within the material is essentially cone-shaped with the apex of such cone at or near the energizing crystal. Since the angle of reflection and the angle of incidence are essentially equal, the reflected waves are also confined to a similar cone-shaped zone, which cone is inverted with respect to the previously mentioned cone and possesses an area coincident with it at the surface causing such reflection.

When continuous wave trains are employed, it is necessary to provide receiving means in contact with the material separate from the transmitter means. When such receiver means are to be used in contact with the same surface of the material as that contacted by the transmitter, it is apparent that the spacing between transmitter and receiver means will determine the minimum thickness of the material under test below which the reflected waves will be prevented from affecting the receiver means. Thus, in the inspection of thin materials, it is desirable that the spacing between the transmitter and receiver means be made as small as is physically feasible. Furthermore, it is desirable to utilize receiver means of such shape that a substantial portion of its surface in contact with such material is affected by the reflected mechanical wave energy.

It is an object of my invention to provide a piezoelectric crystal holder possessing transmitter and receiver crystals properly arranged for use in the inspection of thin materials.

Another object of my invention is to provide a piezoelectric crystal holder possessing a transmitter crystal surrounded by a concentric receiver crystal in close spaced relationship thereto.

It is another object of my invention to provide a piezoelectric crystal holder possessing both transmitter and receiver crystals which are shielded from extraneous electrical and supersonic disturbances and also shielded from each other in such fashion that the receiver means are effected only by ultrasonic mechanical vibrations traversing the material under test.

The features of the invention which are believed to be novel and patentable will be pointed out in claims appended hereto. For a better understanding of my invention, reference is made in the following description to the accompanying drawing in which Fig. 1 discloses a cross-sectional side view of a preferred embodiment of my invention; Fig. 2 is a partially cut-away top view of the apparatus of Fig. 1; Figs. 3 and 4 illustrate the relationships between thicknesses of material under test, the spacing between transmitter and receiver crystals, and the resulting ultrasonic linkage between them, and Fig. 5 illustrates the use of a plurality of crystals in a crystal holder which may include the features shown in Fig. 1 and described in reference thereto.

Referring now to Figs. 1 and 2, the supporting structure for a circular disk-type piezoelectric crystal 1 and a similar structure for a piezoelectric crystal 2 of annular type may, along with the electrical circuits associated with each, be encased in an appropriately shaped casing 3, preferably of conducting material, containing the open-ended cylindrical recesses 4, 5, 6, and 7. The relationship between crystals 1 and 2 may equally well be obtained by utilizing a crystal of any shape for the outer crystal, which crystal is caused to possess a central opening of such shape as to accommodate a second crystal of any appropriate size and shape therein, which opening permits a spaced relation between the two crystals when positioned coplanarly. Cylindrical recess 6, as shown in Fig. 2, is coaxial with but separate from recess 5. Cylindrical recess 7, employed for purposes to be described, may be covered by a capping screw 8, thereby shielding from external effects the electrical circuit passing through recess 7. Suitable concentric cable terminal connectors 9 and 10 are affixed to access openings into recesses 5 and 6 respectively.

An inductance coil 11, preferably of the tunable type, is placed in recess 5 and an identical coil 12, as shown in Fig. 2, is placed in recess 6. These coils are of the type disclosed and claimed in application S. N. 712,266, of Erik B. Hansell, filed November 26, 1946, and assigned to the assignee of this application, and are employed for purposes described therein. Coils 11 and 12 may be held in position within their respective recesses by attachment to cover plates 13 which may in turn be affixed over the open ends of recesses 5 and 6 respectively. By providing an access opening 14 in each of the cover plates 13, exteriorly controlled tuning of each coil is possible.

A closely fitting sleeve 15 of insulating material having an inwardly projecting collar 16 integral therewith essentially midway along its axial dimension is fitted into cylindrical recess 4. A coil spring 17 of conducting material is supported at one end by collar 16 and its opposite end rests in an annular groove in a ring member 18 of conducting material. A second annular ring 19, also of a conducting material, cooperating with ring 18 and supported thereby, is provided with a surface to which the annular ring-type crystal 2 may be attached. Ring 19 is preferably of such design that mechanical vibrations in crystal 2 will not be seriously damped by virtue of its attachment to ring 19.

A hollow tube 20 of conducting material and fitted with an outwardly projecting flange at one end thereof is provided with an exteriorly threaded extension of reduced diameter at its other extremity. An enclosing shield 21 of insulating material with a similarly projecting lower flange is provided in such fashion that tube 20 is effectively covered by it except for the upwardly extending threaded portion.

An internally threaded recess 22 is provided in casing 3 extending upwardly from the inner end of recess 4 coaxially therewith and of such size as to cooperate with the threaded portion of hollow tube 20. A threaded plug 23 of insulating material, into which a block 24 of conducting material is embedded coaxially therewith, is provided for insertion into the innermost part of recess 22. The threaded portion of tube 20 is then introduced into recess 22 and screwed into a position such that the upper portion of shield 21 abuts against the inner end of recess 4. When in this position, the outwardly extending flange at the lower extremity of shield 21 cooperates with ring 19 in such fashion that the downward motion of crystal 2, as urged by spring 17, is limited thereby. Thus when tube 20 is in the position described the supporting structure for crystal 2, allowing limited motion thereof, is completed and is accomplished in such fashion that the crystal and the members electrically associated with it are insulated from casing 3 and from tube 20 associated with casing 3. Tube 20 provides a space surrounded by the structure supporting crystal 2 which space is electrically insulated from crystal 2 and is also electrostatically and supersonically shielded from it by tube 20.

A supporting mechanism for crystal 1 may be constructed within tube 20 in the following manner: A hollow insulating sleeve 25, smaller in length than tube 20 and of a diameter equal to the internal diameter of tube 20 and possessing an upwardly extending portion, is closely fitted into tube 20 in such fashion that its upwardly extending portion passes into the threaded portion of tube 20. The upwardly extending portion of sleeve 25 possesses a central opening through which a metal stud 26 may extend to contact block 24. The lower end of stud 26 within sleeve 25 possesses an enlarged cross section properly dished so as to accommodate one end of a metallic spring member 27. A similarly constructed stud 28 is provided in such position that its head accommodates the other end of spring 27. Stud 28 is held in a position such as to maintain spring 27 under slight compression by means of the inwardly projecting flange of the insulating sleeve 29 fitted within tube 20 and affixed to the lower end of sleeve 25 by any convenient means such as screws through sleeve 29 into sleeve 25. Stud 26 is held in contact with block 24 by the action of spring 27. Sleeve 29 in cooperation with sleeve 25 provides a total continuous insulation within tube 20. Threadedly engaged with and supported by the lower end of stud 28 a circular metallic plate 30 is provided whose diameter is such that appropriate clearance between it and sleeve 29 results. A metallic circular plate 31, upon which crystal 1 may be suitably mounted, possesses annular flanges extending in both directions. One such flange aids in proper mounting of crystal 1 upon plate 31 and the other flange cooperates with plate 30 and is affixed thereto in such fashion as to allow crystal 1 to be supported by plate 30 without undue damping of the mechanical vibrations in the crystal.

The designed clearances between ring 19 and the insulating walls on each side of the ring afford such freedom of movement that crystal 2 will properly contact the surface of the material upon which casing 3 may be caused to rest. In addition, spring 17 may be designed to cause the desired pressure of such contact. The supporting plate 30 for crystal 1 is similarly designed for sufficient freedom of motion to allow proper contact between crystal 1 and the surface of the material upon which casing 3 may be placed. Spring 27 may be designed to cause proper contact between crystal 1 and such material.

It should be noted that disassembly of the structure shown in Fig. 1 is easily accomplished by unscrewing casing 20, thereby removing it and its contents from recess 4. Ring 19 supporting crystal 2 and spring 17 may then be removed for inspection or repair. Plate 30 and crystal 1 may be removed from casing 20 by unscrewing plate 30 from stud 28.

Electrical connection to crystal 1 may be obtained with tuning coil 11 in series therewith by utilizing an insulated metal screw 32 which threadedly engages block 24 in recess 22. Insertion of screw 22 is made possible by providing the cylindrical recess 7 previously described in opposed spaced relationship with respect to recess 22. The electrical circuit insulated from casing 3 continues from block 24 through stud 26, spring 27, stud 28, plates 30 and 31, thence to the unexposed surface of crystal 1. When contact between the exposed surface of crystal 1 and casing 3 is made, as by placing the holder upon a conducting material to be analyzed, the outer terminal of connector 9 is electrically connected to the exposed surface of crystal 1.

Similarly, as is better shown in Fig. 2, the electrical connection from the unexposed surface of crystal 2 to the inner conductor of connector 10 is obtained through rings 18 and 19, spring 17, a conductor 33, one end of which is connected to the upper end of spring 17, and thence through coil 12. The exposed surface of crystal 2 will be similarly connected to casing 3 when casing 3 is placed upon a conducting material to be analyzed.

The inclusion of a supporting structure for a receiver crystal, as well as the supporting structure for a transmitter crystal, and a tuning coil electrically associated with each, compactly arranged within the same casing is obviously advantageous as to ease of handling and manipulation during use. However, the principal advantage of a structure embodying the features of my invention may be pointed out by referring to Figs. 3 and 4. Fig. 3 shows crystals 1 and 2 resting upon a material 34 of thickness $t_1$ and in Fig. 4 the same crystals 1 and 2 are shown in contact with a material 35 of thickness $t_2$.

If crystal 1 is operated as a source of mechanical vibrations, it has been found that these vibrations will be propagated through the material in a manner indicated by the solid lines through the material 34. Upon arrival at a point of discontinuity, such as represented by the opposite surface of material 34, the vibrations will be reflected and the reflected vibrations will be propagated in essentially the direction illustrated by the dotted lines in material 34. Thus, for the thickness $t_1$, as illustrated in Fig. 3, the receiver crystal 2 will be unaffected by the mechanical vibrations set up by transmitter crystal 1. In Fig. 4 however thickness $t_2$ is sufficiently greater than $t_1$ so as to enable the mechanical vibrations to be evident over a considerable surface contact area of crystal 2. It has been found that at a frequency of one megacycle the divergence of mechanical vibrations through a material under test is essentially 25 degrees from the vertical in a case such as is illustrated in Fig. 3 or 4. By utilizing crystal 1 as a transmitter surrounded by a concentric annular-type receiver crystal 2 in a structure as illustrated in Fig. 1, I have found that satisfactory results may be obtained with materials as thin as one-eighth inch in thickness. It should be apparent that results of this nature would not be possible if crystals were utilized in a side-by-side spaced relationship.

It may also be shown that the angle of divergence of mechanical vibrations is an inverse function of the frequency of such vibrations. Thus, at frequencies below one megacycle, the angle of divergence is greater than 25 degrees and operation on materials less than one-eighth inch thick should be satisfactory.

In Fig. 1 I have shown a crystal holder for a single transmitter crystal combined with a single receiver crystal. It should be apparent that a series of crystals of essentially equal thickness and of sequentially decreasing order in the remaining dimensions could be utilized if each crystal possessed a central opening sufficiently large to allow the insertion of the next smaller crystal therein in spaced relation thereto. In such an arrangement alternate crystals are preferably employed as transmitters in parallel and the remaining crystals utilized as receivers in parallel. This is illustrated in Fig. 5 wherein 1, 1a, etc. are transmitter crystals and 2, 2a, etc., are receiver crystals. It should be understood that shields similar to 20 of Fig. 1 may extend into the interspaces as shown in Fig. 1 and internal insulating sleeves and external insulating sleeves similar to 21 and 29 of Fig. 1 may be associated with such shields.

While I have shown an alternate arrangement of transmitter and receiver crystals utilizing crystals of annular ring type, it is apparent that other configurations may also be employed without departing from the scope of my invention.

As will occur to those skilled in the art, various different arrangements and combinations of the principles described above may be employed without departing from the true spirit and scope of the invention and I therefore do not wish to limit my invention to the particular arrangement described.

What I claim as new and desire to secure by Letters Patent of the United States is:

1. In combination, a plurality of piezoelectric crystals of essentially equal thickness and of sequentially decreasing outside diameters and all except the smallest having a central opening of such size as to permit insertion therein of the next smaller crystal in spaced relation thereto, resilient supporting means for each of said crystals adapted to support a crystal by contact with one surface thereof, and a base of conducting material adapted to support said resilient supporting means so as to expose the free surfaces of said crystals coplanarly and in said spaced relation, said base containing shielding portions of conducting material extending into said central openings toward said free surfaces of said crystals and interposed in spaced relation between adjacent crystals.

2. In combination, a plurality of piezoelectric crystals of essentially equal thickness and of sequentially decreasing outside diameters and all except the smallest having a central opening of such size as to permit insertion therein of the next smaller crystal in spaced relation thereto, resilient supporting means for each of said crystals adapted to support a crystal by contact with one surface thereof, a base of conducting material adapted to support said resilient supporting means so as to expose the free surfaces of said crystals coplanarly and in said spaced relation, said base containing shielding portions of conducting material extending into said central openings toward said free surfaces of said crystals and interposed in spaced relation between adjacent crystals, means for connecting the unexposed surfaces of alternate one of said crystals to a common electrical terminal, and means for connecting the unexposed surfaces of the remainder of said crystals to a second common electrical terminal.

3. In combination, a crystal holder, a plurality of crystals resiliently supported in one face thereof, said crystals being concentrically arranged and insulated and shielded from each other in said holder and having substantially coplanar faces outwardly of the crystal holder adapted for simultaneous contact with a flat surface, separate electrical connections to adjacent crystals adapted for connection to external circuits and tuning inductances contained within said crystal holder in said connections.

4. In combination, a casing of conducting material possessing at least one recess extending into it from a surface thereof, a first piezoelectric crystal, resilient mounting means affixed within said recess of said casing adapted to support said first crystal by contact with one surface thereof for exposure of the opposite surface of said crystal outwardly from said recess of said casing, a second piezoelectric crystal having a central opening adapted to permit insertion of said first crystal therein in spaced relation thereto, resilient mounting means affixed within said recess of said casing adapted to support said second crystal by contact with one surface thereof for exposure of the opposite surface of said second crystal outwardly from said recess of said casing coplanarly with and surrounding said first crystal, and connecting means electrically insulated from said casing for making electrical contact with the unexposed surfaces of said crystals from points external to said casing.

5. In combination, a casing of conducting material possessing at least one recess extending into it from a surface thereof, a first piezoelectric crystal, resilient mounting means affixed within said recess of said casing adapted to support said first crystal by contact with one surface thereof for exposure of the opposite surface of said crystal outwardly from said recess of said casing, a second piezoelectric crystal having a central opening adapted to permit insertion of said first crystal therein in spaced relation thereto, resilient mounting means affixed within said recess of said casing adapted to support said second crystal by contact with one surface thereof for exposure of the opposite surface of said second crystal outwardly from said recess of said casing coplanarly with and surrounding said first crystal, a first inductance coil within said casing connected in electrical series relation to the unexposed surface of said first crystal, and a second inductance coil within said casing connected in electrical series relation to the unexposed surface of said second crystal.

6. In combination, a casing of conducting material possessing at least one recess extending into it from a surface thereof, a first piezoelectric crystal, resilient mounting means affixed within said recess of said casing adapted to support said first crystal by contact with one surface thereof for exposure of the opposite surface of said crystal outwardly from said recess of said casing, a second piezoelectric crystal having a central opening adapted to permit insertion of said first crystal therein in spaced relation thereto, resilient mounting means affixed within said recess of said casing adapted to support said second crystal by contact with one surface thereof for exposure of the opposite surface of said second crystal outwardly from said recess of said casing coplanarly with and surrounding said first crystal, shielding means of conducting material supported by said casing and in electrical contact therewith within said recess interposed between said first and said second crystals and between their respective mounting means and extending outwardly in spaced relation between said first and said second crystals and having its outwardly extending end coplanar with the said surface of said casing possessing said recess, and connecting means electrically insulated from said casing for making electrical contact with the unexposed surfaces of said crystals from points external to said casing.

7. In combination, a casing of conducting material possessing at least one recess extending into it from a surface thereof, a first piezoelectric crystal, resilient mounting means centrally affixed within said recess of said casing adapted to support said first crystal by contact with one surface thereof for exposure of the opposite surface of said crystal outwardly from said recess of said casing, a second piezoelectric crystal having a central opening adapted to permit insertion of said first crystal therein in spaced relation to said second crystal, resilient mounting means affixed within said recess of said casing adapted to support said second crystal by contact with one surface thereof for exposure of the opposite surface of said second crystal outwardly from said recess of said casing coplanarly with said opposite surface of said first crystal, shielding means of conducting material supported by said casing and in electrical contact therewith within said recess interposed between said first and said second crystals and between their respective mounting means and extending outwardly in spaced relation between said first and said second crystals and having its outwardly extending end coplanar with the said surface of said casing possessing said recess, and connecting means including inductance coils within said casing electrically insulated from said casing for making electrical contact with the unexposed surfaces of said crystals from points external to said casing.

CHARLES D. MORIARTY.

REFERENCES CITED

The following references are of record in the file of this patent:

UNITED STATES PATENTS

| Number | Name | Date |
|---|---|---|
| 2,431,233 | Erwin | Nov. 18, 1947 |